United States Patent
Hebling et al.

(10) Patent No.: US 10,747,086 B2
(45) Date of Patent: Aug. 18, 2020

(54) METHOD AND SETUP TO GENERATE TERAHERTZ RADIATION SCALABLE IN ENERGY

(71) Applicant: Pécsi Tudományegyetem, Pécs (HU)

(72) Inventors: János Hebling, Pécs (HU); Gábor Almási, Kozármisleny (HU); László Pálfalvi, Pécs (HU); József András Fülöp, Pécs (HU); Gergő Krizsán, Pécs (HU)

(73) Assignee: Pécsi Tudományegyetem, Pécs (HU)

( * ) Notice: Subject to any disclaimer, the term of this patent is extended or adjusted under 35 U.S.C. 154(b) by 0 days.

(21) Appl. No.: 16/532,824

(22) Filed: Aug. 6, 2019

(65) Prior Publication Data
US 2020/0041867 A1    Feb. 6, 2020

(30) Foreign Application Priority Data
Aug. 6, 2018 (EP) .................................... 18187615

(51) Int. Cl.
*G02F 1/35* (2006.01)
*G02F 1/365* (2006.01)
*G02F 1/355* (2006.01)

(52) U.S. Cl.
CPC .......... *G02F 1/3534* (2013.01); *G02F 1/3544* (2013.01); *G02F 1/3551* (2013.01); *G02F 1/365* (2013.01); *G02F 2203/13* (2013.01)

(58) Field of Classification Search
CPC .... G02F 1/3501; G02F 1/3544; G02F 1/3551; G02F 2001/3503; G02F 2203/13; G02F 2202/20
See application file for complete search history.

(56) References Cited

U.S. PATENT DOCUMENTS 7,272,158 B1    9/2007 Hayes
8,514,482 B2    8/2013 Okano
(Continued)

FOREIGN PATENT DOCUMENTS

EP    2354841    8/2011
EP    3396447    10/2018
(Continued)

OTHER PUBLICATIONS

L. Pálfalvi et al, Hybrid tilted-pulse-front excitation scheme for efficient generation of high-energy terahertz pulses; Optics Express; vol. 24, No. 8, Apr. 6, 2016; 14 pages.
(Continued)

*Primary Examiner* — Daniel Petkovsek
(74) *Attorney, Agent, or Firm* — Fitch, Even, Tabin & Flannery LLP

(57) ABSTRACT

A pump beam (12) is pre-tilted by subjecting the pump beam to pulse-front-tilting, the thus obtained tilted-pulse-front pump beam is then coupled into the nonlinear optical medium. THz radiation is generated in the optical medium by nonlinear optical processes, in particular by optical rectification, by the pump beam. A pulse-front-tilt of the pump beam satisfying the velocity matching condition of $v_{p,cs}\cos(\gamma)=v_{THz,f}$ is induced as a sum of a plurality of pulse-front-tilts separately induced as a partial pulse-front-tilt of the pump beam in subsequent steps. The last step of pulse-front-tilting of the pump beam is performed by coupling the pump beam into the nonlinear optical medium through a stair-step structure (40) formed in an entry surface (51) of the nonlinear optical medium which forms an angle (Γ) of a given non-zero size with an exit surface (52) of said nonlinear optical medium.

19 Claims, 6 Drawing Sheets

(56) References Cited

U.S. PATENT DOCUMENTS

Figure 1:
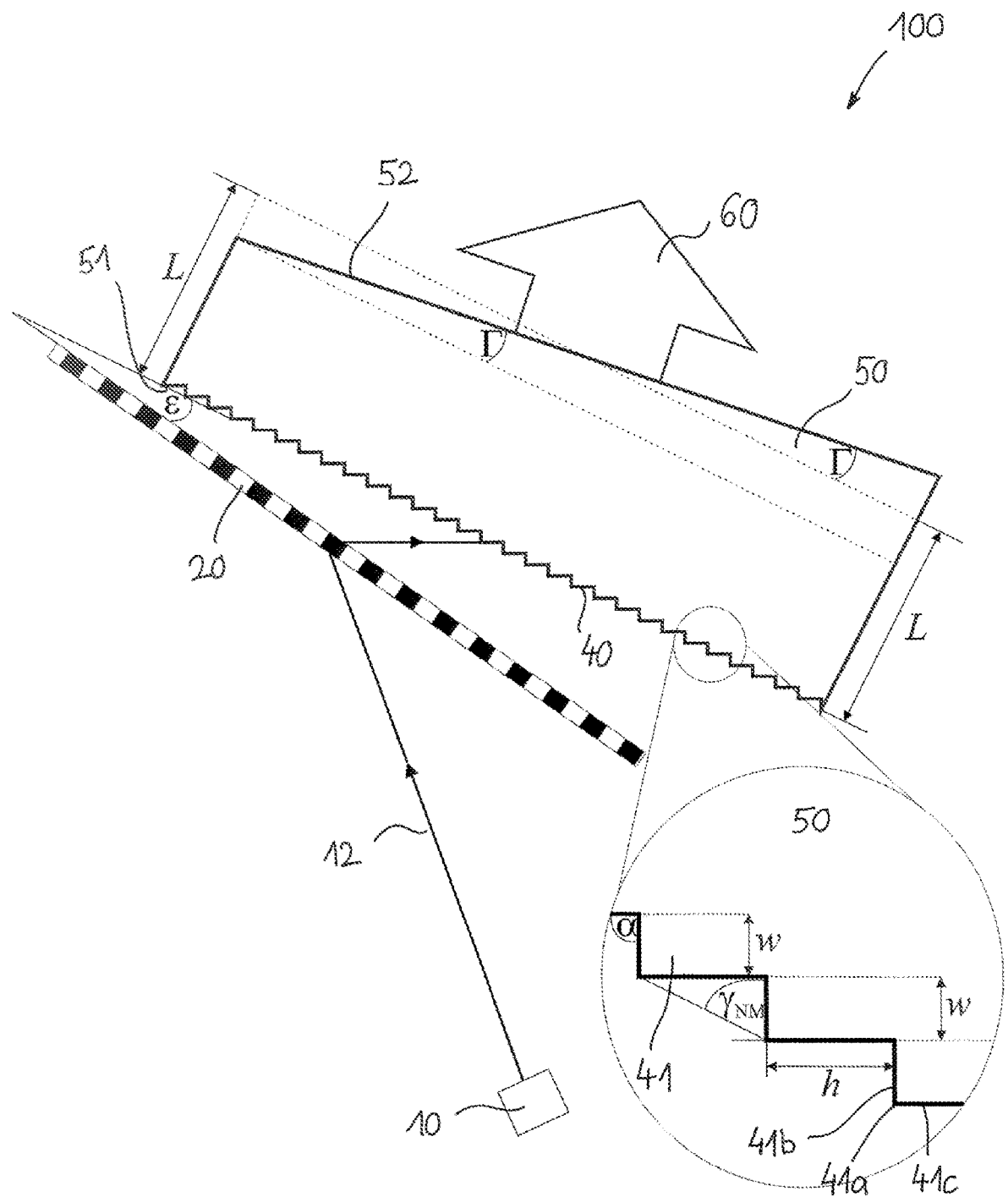

| | | | |
|---|---|---|---|
| 8,564,875 B2 | 10/2013 | Kawada | |
| 9,024,260 B2 | 5/2015 | Ouchi | |
| 1,035,968 A1 | 7/2019 | Almási | |
| 10,359,687 B2* | 7/2019 | Almasi | G02F 1/3551 |
| 10,481,468 B2* | 11/2019 | Hebling | G02F 1/3534 |
| 2013/0075629 A1 | 3/2013 | Doi | |
| 2018/0292729 A1 | 10/2018 | Almási | |
| 2018/0373119 A1* | 12/2018 | Hebling | G02F 1/3544 |

FOREIGN PATENT DOCUMENTS

| | | |
|---|---|---|
| JP | 2010139604 | 6/2010 |
| JP | 2014044365 | 3/2014 |
| WO | 2017081501 | 5/2017 |

OTHER PUBLICATIONS

Hebling J. et al., "Velocity matching by pulse front tilting for large-area THz-pulse generation", Optics Express, (2002), vol. 10, No. 21; 6 pages.

H. Hirori et al., "Single-cycle terahertz pulses with amplitudes exceeding 1 MV/cm generated by optical rectification in LiNbO3", Applied Physics Letters, (2011), vol. 98, No. 9; 3 pages.

Blanchard et al., "Terahertz pulse generation from bulk GaAs by a tilted-pulse-front excitation at 1.8 μm", Applied Physics Letters, (2014), vol. 105; 5 pages.

J. Fiilop et al., "Design of high-energy terahertz sources based on optical rectification", Optics Express, (2010), vol. 18, No. 12; 17 pages.

J. Fiilop et al., "Design of high-energy terahertz sources based on optical rectification: erratum"; Optics Express, vol. 19, No. 23; Nov. 7, 2011; 1 page.

L. Palfalvi et al., "Novel setups, for extremely high power single-cycle terahertz pulse generation by optical rectification", Applied Physics Letters, (2008), vol. 92, No. 1; 4 pages.

A. Nagashima et al., "Design of Rectangular Transmission Gratings Fabricated in LiNbO3 for High-Power Terahertz-Wave Generation", Japanese Journal of Applied Physics, (2010), vol. 49; 6 pages.

A. Nagashima et al., "Design of Rectangular Transmission Gratings Fabricated in LiNbO3 for High-Power Terahertz-Wave Generation", Japanese Journal of Applied Physics—Erratum, 2012, vol. 51; 2 pages.

Ollmann Z. et al., "Design of a contact grating setup for mJ-energy THz pulse generation by optical rectification", Applied Physics B, (2012), vol. 108, No. 4; 6 pages.

Ollmann Z. et al., "Design of a high-energy terahertz pulse source based on ZnTe contact grating", Optics Communications, (2014), No. 315; 5 pages.

M. Kunitski et al., "Optimization of single-cycle terahertz generation in LiNb03 for sub-50 femtosecond pump pulses", Optics Express, (2013), vol. 21, No. 6; 11 pages.

Written Opinion of the International Searching Authority dated May 7, 2017 for PCT/HU2016/050062; 7 pages.

International Search Report dated Jun. 6, 2017 for PCT/HU2016/050046; 4 pages.

Michael I. Bakunov et al, "Terahertz generation with tilted-front laser pulses in a contact-grating scheme"; Journal of the Optical Society of America—B., US, vol. 31, No. 11, Nov. 2014; 10 pages.

J. A. Fülöp et al., entitled "Efficient generation of THz pulses with 0.4 mJ energy"; Optics Express; vol. 22, issue 17, pp. 20155-20163, 2014; 9 pages.

Tsubouchi et al. published in the Conference Proceedings of the "41th International Conference on Infrared, Millimeter and Terahertz Waves (IRMMW-THz)" (Sep. 25-30, 2016) under the title of Compact device for intense THz light generation: Contact grating with Fabry-Perot resonator; 2 pages.

G.K. Abgaryan et al., entitled "Investigation of Parameters of Terahertz Pulses Generated in Single-Domain LiNbO3 Crystal by Step-Wise Phase Mask" (see Journal of Contemporary Physics (Armenian Academy of Siences), vol. 51, issue 1, pp. 35-40, 2016; 6 pages.

Ofori-Okai et al., entitled "THz generation using a reflective stair-step echelon" (see Optics Express, vol. 24, issue 5, pp. 5057-5067, 2016; 12 pages.

J. A. Fülöp et al. entitled "Design of high-energy terahertz sources based on optical rectification" (Optics Express, vol. 18., pp. 12311-12327, 2010; 17 pages.

Ollmann et al.; entitled Design of a Contact Grating Setup for mJ-Energy THz Pulse Generation by Optical Rectification; Applied Physics B Lasers and Optics; published online Sep. 23, 2012; 6 pages.

L. Pálfalvi et al., "Numerical Investigation of a Scalable setup for Efficient Terahertz Generation Using a Segmented Tilted-Pulse-Front Excitation"; Optics Express, vol. 25, issue 24 pp. 29560-29573.

* cited by examiner

METHOD AND SETUP TO GENERATE TERAHERTZ RADIATION SCALABLE IN ENERGY

The present invention relates to a method and a setup to generate terahertz radiation. In particular, the present invention relates to a novel method and setup of enhanced efficiency to generate terahertz pulses with improved beam properties and energy scalability of the terahertz pulses generated.

Nowadays, the acceleration of electrically charged particles, such as e.g. electrons or protons, is a new and promising field of application of intense terahertz (THz) pulses with frequencies falling into the range of substantially 0.1 to 10 THz (as per agreement). Terahertz pulses are conventionally generated by coupling ultrashort light pulses, i.e. light pulses having a pulse length in the femtosecond (fs) to picoseconds (ps) domain, into a crystal with nonlinear optical properties, in general, by means of optical rectification within the crystal. To this end, pump pulses of visible or near infrared are typically used with a pulse length of several hundreds of femtoseconds.

To accomplish efficient terahertz radiation generation, the so called velocity matching condition has to be met. This means that the group velocity of the pump pulse used for the generation has to be equal to the phase velocity of the THz pulse thus generated. If said velocities are close to each other, i.e. the group refraction index of the nonlinear crystal at the frequency of pumping differs from the refraction index in the THz domain only to a reasonably small extent, fulfillment of this condition may be achieved by known means.

The second order nonlinear optical coefficient of the (crystal) material affects decisively the efficiency of terahertz radiation generation. For some materials, in which said coefficient is high (exceeds, typically, several tens of pm/V's) and the aforementioned refraction index difference is also high, the terahertz radiation generation at velocity matching becomes unachievable. This is the case for several materials: some semiconductors, such as e.g. gallium-phosphide (GaP), zinc-telluride (ZnTe), as well as lithium-niobate (LN) and lithium-tantalate (LT) that have exceptionally high (160 to 170 pm/V) nonlinear optical coefficients, wherein the ratio of the group refraction index at the pump frequency and the phase refraction index in the THz domain is greater than two. A solution for the problem is the tilted-pulse-front technique (see the paper by J. Hebling et al., entitled "*Velocity matching by pulse front tilting for large-area THz-pulse generation*"; Optics Express; Vol. 10, issue 21, pp. 1161-1166. (2002)). Accordingly, the generation of terahertz radiation is carried out by a light pulse, whose pulse front (intensity front) is at a desired angle ($\gamma$) to the wave front. As the THz beam generated propagates perpendicularly to the tilted pulse front, due to said velocity matching condition, the projection of the pumping group velocity $v_{p,cs}$ along the direction of THz radiation propagation has to be equal to the phase velocity $v_{THz,f}$ of the THz beam, that is, the relation of $$v_{p,cs} \cos(\gamma) = v_{THz,f} \quad (1)$$

has to be met. Particularly, for pump wavelengths in the near-infrared domain and at temperatures ranging from about 100 K to about 293-298 K, i.e. room temperature, this relation is satisfied at $\gamma \approx 620$ to 630 for LN, $\gamma \approx 680$ to 690 for LT, and $\gamma \approx 22°$ to 29° for ZnTe, respectively.

At present, the highest energy THz pulses with frequencies suitable for particle acceleration (i.e. of about 0.2 to 1.0 THz) can be generated by means of LN crystals and by exploiting the tilted-pulse-front technique (see the paper by J. A. Fülöp et al., entitled "*Efficient generation of THz pulses with 0.4 mJ energy*"; Optics Express; Vol. 22, issue 17, pp. 20155-20163 (2014)). The high energy THz radiation sources described in this publication, which produce pulse energies of 0.43 mJ, always make use of a prism shaped LN crystal as the nonlinear optical crystal. The reason for this, on the one hand, is that to minimize the reflection losses, the pump pulse has to enter the crystal perpendicularly and the THz pulse generated has to exit therefrom also perpendicularly. On the other hand, coupling out the THz beam at right angle ensures that the beam is free from angular dispersion that is a very important requirement from the point of view of further utilization. Accordingly, to meet the above velocity matching condition (1), the exit plane of the LN crystal has to form a wedge angle with the entry plane of the LN crystal that is equal to the angle $\gamma$.

As the wedge angle in the case of LN crystals is large ($\gamma \approx 63°$), at high energy THz generation, making use of the medium for generating THz radiation in the form of a prism is highly detrimental to the quality of the THz beam thus generated, because for a wide pump beam, which is necessary for generating high energy THz pulses, the THz pulses being formed at two opposite sides of the pump beam in cross-section are generated over significantly different lengths and, hence, are subject to absorption and dispersion to different extents; moreover, the nonlinear effects are also different in the LN crystal at said locations of generation. Therefore, the intensity of, as well as the temporal electric field profile in the THz pulses generated at portions located symmetrically at the two sides of the pump pulse are significantly different, i.e. a highly asymmetric THz beam of bad quality is obtained. An important criterion for achieving efficient particle acceleration is to maintain a precise synchronization between the particle to be accelerated and the pulse having a field strength of controllable temporal profile to be used for the acceleration. Hence, the thus obtainable asymmetric THz beam of low beam quality is unfit for the synchronization, and thus for efficient particle acceleration.

In the conventional tilted-pulse-front technique, pulse-front-tilt of the pump beam is generally obtained by diffracting said pump beam on a (reflection or transmission) optical grating which is arranged in the beam path. Then the beam is guided, through a lens or a telescope by means of imaging, into a nonlinear crystal for terahertz radiation generation: an image of the beam spot on the surface of the grating is created inside the crystal. Imaging errors of the conventional tilted-pulse-front THz radiation sources cause distortion of the pump pulse, namely, said errors result in a local increase of the pump pulse length (see the papers by L. Pálfalvi et al., entitled "*Novel setups for extremely high power single-cycle terahertz pulse generation by optical rectification*"; Applied Physics Letters, Vol. 92, issue 1., pp. 171107-171109 (2008) and Fülöp et al., entitled "*Design of high-energy terahertz sources based on optical rectification*" (see Optics Express, vol. 18, issue 12, pp. 12300-12327 (2010)). In case of pump beams with large cross-section (i.e. wide beams) this effect is highly detrimental to the efficiency of terahertz radiation generation. To remedy this, the above cited scientific publication proposes the use of a so-called contact grating scheme that is free from imaging optics and thus from imaging errors due to imaging optics. In this scheme the tilt of the pulse front is obtained by diffracting the pump beam on a transmission optical grating formed directly (e.g. by etching) in the surface of the nonlinear crystal. The magnitude of the period of the grating to be formed (generally, in the micrometer or sub-micrometer domain) is determined by the material of the nonlinear crystal and the wavelength of the pumping. For LN and assuming a pump wavelength of typically ~1 µm, the contact grating has to be provided with a line density of typically at least 2500-3000 1/mm (see the paper by Nagashima et al., entitled "*Design of Rectangular Transmission Gratings Fabricated in LiNbO3 for High-Power Terahertz-Wave Generation*"; Japanese Journal of Applied Physics, vol. 49, pp. 122504-1 to 122504-5 (2010); and the corrected paper entitled "*Erratum: Design of Rectangular Transmission Gratings Fabricated in LiNbO3 for High-Power Terahertz-Wave Generation*"; Japanese Journal of Applied Physics, vol. 51, p. 122504-1 (2012), as well as the paper by Ollmann et al., entitled "*Design of a contact grating setup for mJ-energy THz pulse generation by optical rectification*"; Applied Physics B, vol. 108, issue 4, pp. 821-826 (2012)). At the moment, preparation of an optical grating with such a line density is not obvious in practice, if at all it is possible. In addition, test experiments show, that if the line density of the grating exceeds a threshold value (which is about 2000 1/mm for LN), the profile of the obtained grating becomes blurred. Consequently, diffraction efficiency of the obtained grating falls greatly behind the theoretically predicted value, which results in a drastic reduction of the efficiency of the terahertz radiation generation due to the highly reduced efficiency of coupling in the pump pulse.

A further significant disadvantage of the contact grating scheme lies in the fact that it is not possible to generate terahertz radiation efficiently when a plane-parallel structure is used; it is unavoidable to tilt the entry and exit planes relative to each other (at an angle of about 30°, for LN), and to provide, thus, the medium used for the terahertz radiation generation in the form of a prism-shaped element (see the above-referred paper by Ollmann et al. from 2012).

The paper by Tsubouchi et al. published in the Conference Proceedings of the "41th International Conference on Infrared, Millimeter and Terahertz Waves (IRMMW-THz)" (25-30 Sep. 2016) with the title "*Compact Device for Intense THz Light Generation: Contact Grating with Fabry-Perot Resonator*" discloses a method for generating terahertz pulses by means of contact grating. To increase the efficiency of coupling in the nonlinear crystal provided in the form of a plane-parallel element, a double coating layer acting as a Fabry-Perot resonator is formed between the surface of the crystal and the diffraction grating. Coupling out the obtained THz beam from said plane-parallel structure at the exit plane takes place in a direction other than perpendicular. In case of THz pulses consisting of a few cycles only and having a wide bandwidth, this is highly disadvantageous: separation of the individual spectral components makes impossible the practical utilization of the THz pulses thus obtained.

The paper by Ofori-Okai et al., entitled "*THz generation using a reflective stair-step echelon*" (see Optics Express, vol. 24, issue 5, pp. 5057-5067 (2016)) discloses a tilted-pulse-front technique for terahertz radiation generation, wherein pulse-front-tilt of the pump beam is achieved via reflection on a stepped structure with a period of about one hundred micrometers in magnitude (a scheme for generation based on a reflection echelle grating) instead of a diffraction grating with a period falling into the micrometer domain. When being reflected, the pulse front is subject to an average tilt, whose extent is determined by the height and the width of the steps of the stepped structure. The fine structure of the pulse front will also be step-like, the width of said fine structure is twice the width of the stepped grating, while its height will be equal to the height of the stepped grating. The pulse-front-tilt required by velocity matching is set by imaging optics arranged in the propagation path of the pump pulse. The THz radiation thus generated propagates within the crystal along a direction perpendicular to the envelope of the stepped pulse front. Thus, coupling out the THz radiation from the crystal requires a prism with the same wedge angle (of about 63°, for an LN crystal) as in the conventional scheme (see above). Consequently, especially when using wide pump beams needed for high energy terahertz radiation generation, the THz radiation obtained will be asymmetric and thus is unfit for e.g. particle acceleration.

International Publication Pamphlet No. WO 2017/081501 A2 and a paper by Pálfalvi et al., entitled "*Hybrid tilted-pulse-front excitation scheme for efficient generation of high-energy terahertz pulses*" (see Optics Express, vol. 24, issue 8, pp. 8156-8169 (2016)) disclose a method and a radiation source for generating terahertz radiation. The solution disclosed is obtained by combining the conventional tilted-pulse-front scheme (see above) with a contact grating. Pulse-front-tilting takes place, preferably, in two (or more) separate steps in such a way that pulse-front-tilt of the pump beam is distributed between the conventional setup and the contact grating. Thus, the imaging error occurring in this scheme is greatly reduced compared to that of the conventional scheme. Furthermore, according to model calculations performed for an LN crystal, preferentially, a terahertz radiation generation with good efficiency can be achieved even for a line density lower than (i.e. of less than about 2000 1/mm) the line density required in the common contact grating scheme. To accomplish the method, the radiation source comprises a pump source for emitting a pump pulse and a nonlinear optical medium for generating the THz pulses, wherein the pump source and the nonlinear optical medium define together a light path, said pump pulse travels along this light path from the pump source to the nonlinear optical medium. In said light path, there are arranged a first optical element with angular-dispersion-inducing properties and imaging optics one after the other along the propagation direction of the pump pulse. Moreover, to induce pulse-front-tilt of the pump pulse in more than one steps, at least one further element with angular-dispersion-inducing properties is also arranged in the light path after the first element with angular-dispersion-inducing properties and the imaging optics. The medium for generating terahertz radiation is provided in the form of a prism-shaped element. As a result of distributing the pulse-front-tilt of the pump beam, the wedge angle of the applied prism becomes lower ($\gamma \approx 30°$ for LN, $\gamma \approx 45°$ for LT) than the wedge angle required by the previous technical solutions, however, it is still large enough to result in the generation of an asymmetric beam being disadvantageous from the aspect of utilization of the terahertz radiation obtained.

The paper by L. Pálfalvi et al., entitled "*Numerical investigation of a scalable setup for efficient terahertz generation using a segmented tilted-pulse-front excitation*" (see Optics Express, vol. 25, issue 24, pp. 29560-29573 (2017)) and EP application no. 17177757.6, that belongs to the prior art in accordance with Article 57(3) EPC, propose a terahertz pulse source of plane-parallel structure (based basically on either LN or LT, or less preferably on further media with nonlinear optical properties). Said source generates symmetric terahertz pulses even with wide pump beams. In the scheme, which is based on fulfilling the velocity matching condition and has a high terahertz-generation efficiency, downstream of a pump beam source, there are arranged a first optical element with angular-dispersion-inducing properties, imaging optics, and a medium with nonlinear optical properties for generating the terahertz radiation in the propagation path of a pump beam emitted by said pump beam source, wherein the medium with nonlinear optical properties is provided in the form of a light-transmitting (i.e. transparent to the pump beam) plane-parallel crystal defined by an entry plane and an exit plane parallel to each other, wherein the entry plane itself is formed as a stair-step structure. The period of the stair-step structure is greater by orders of magnitude, preferably by at least one or two orders of magnitude than the pump wavelength of the pump beam source. From now on, the element with parallel entry and exit planes, also having a stair-step structure in its entry plane is referred to as 'plane-parallel echelon (or stepped/stair-step) contact grating'.

Upon passing through the stair-step structure, the pulse front gets segmented and can be described by an average tilting angle. To achieve velocity-matched terahertz-generation with maximum efficiency, certain geometrical conditions have to be met. Namely, on the one hand, the plane-parallel echelon contact grating is arranged in the propagation path of the pump beam in such a way that an imaginary plane laid on the longitudinal edges of the individual stairs (that is, the envelope of said plane-parallel echelon contact grating) forms an angle $\gamma_{NM}$ with the plane perpendicular to the propagation direction. On the other hand, just before the entry into the medium with nonlinear optical properties, the pulse front of said pump beam is parallel to the envelope of the plane-parallel echelon contact grating.

The scheme based on a plane-parallel echelon contact grating aims primarily at generating terahertz beams with perfect symmetry. However, the necessary plane-parallel structure, as well as the geometry set uniquely for the terahertz-generation as discussed above significantly limit the attainable efficiency of the terahertz-generation itself.

Thus, it would be preferable to have a technical solution, i.e. a method and a setup to generate terahertz radiation that results in an improved efficiency of the terahertz-generation along with maintaining excellent beam properties.

In light of the aforementioned, an object of the present invention is to provide a method and a setup—from now on, a technique—to generate terahertz radiation applicable in practical fields, that allow the generation of terahertz pulses of excellent beam properties (in particular, with symmetric beam profiles, as far as the most important beam characteristics is concerned) and in a scalable manner. Herein and from now on, the term 'scalable' refers to the fact that the radius of the cross-sectional beam spot of the pump beam applied in the terahertz radiation source according to the invention—which is proportional to the square of the desired terahertz pulse energy—can be adjusted between relatively broad limits while maintaining the excellent beam properties of the terahertz radiation generated. In particular, said radius of the beam spot can be varied from a value in the mm domain to a value in the range of several centimeters.

A further object of the present invention is to provide a technique for terahertz radiation generation by means of which the pulse energy and the generation efficiency of THz pulses available nowadays are increased.

A yet further object of the present invention is to provide a technique to generate terahertz radiation for producing electrically charged particles monochromatic in energy and accelerating said particles in a synchronized manner efficiently.

Our studies have led us to the conclusion, that the aforementioned objects can be achieved by a novel setup for terahertz radiation generation based on fulfilling the velocity matching condition, wherein a first optical element with angular dispersion-inducing properties and an optical element made of a light-transmitting (i.e. transparent to the pump beam) medium with nonlinear optical properties are arranged in the propagation path of a pump beam emitted by a pump beam source downstream of the pump beam source, wherein said optical element has an entry plane which is formed as a stair-step structure itself. Here, and from now on, a crystal of nonlinear optical properties with a stair-step structure (also called stair-step echelon) formed in its entry plane is referred to as 'echelon contact grating'. The period of the stair-step echelon is greater by orders of magnitude, preferably at least by one or two orders of magnitude than the wavelength of the pump beam source. Said echelon contact grating consists of stair-steps formed periodically one after the other along an imaginary first direction over the surface of the stair-step echelon; each step comprises two shorter edges and one longitudinal edge that is perpendicular to each of the shorter edges; said longitudinal edge is substantially parallel to an imaginary second direction over the surface of the stair-step echelon that extends at right angle to the imaginary first direction. Furthermore, it is permitted, or for optimizing certain properties of the generated terahertz radiation it is even justified that the entry plane and the exit plane of an echelon contact grating are constructed to form a (pre-defined) non-zero angle (so-called wedge angle). Or putting this another way, the entry plane and the exit plane of said echelon contact grating are not parallel with each other. According to our studies, the value of said wedge angle is at most 20°, more preferably is at most 15°, and most preferably is at most 10°; a precise value for said wedge angle will be, however, ambiguously set by the actual generation geometry that satisfies user demand (that is, large terahertz-generation efficiency, THz beam image of best quality) for given pumping conditions (e.g. wavelength, pulse length, beam diameter) and in a given non-linear optical medium.

Moreover, the echelon contact grating is arranged in the propagation direction to extend transversally to it in such a way that an imaginary plane laid on the longitudinal edges of the stairs (i.e. the envelope of said echelon contact grating) makes a predetermined inclination angle ($\gamma_{NM}$) with a plane perpendicular to the propagation direction. The inclination angle $\gamma_{NM}$ is determined by the geometrical parameters of the individual stairs of the echelon contact grating (i.e. a width w of one of the shorter edges of the stairs and a height h of the other of the shorter edges of said stairs, as well as a step angle $\alpha$ that characterizes tilting of the stairs; said step angle $\alpha$ is the angle of intersection of a first plane defined by one of the shorter edges and the longitudinal edge of each stair, and a second plane defined by the other shorter edge and the longitudinal edge of said stair). In case of right-angled stairs, i.e. with $\alpha=90°$, the relation of $\gamma_{NM}=a\tan(h/w)$ holds. To satisfy the velocity matching condition within the nonlinear optical medium, said inclination angle meets an adequate geometrical criterion. Namely, the average tilt ($\gamma$) of the pulse front of the pump beam coupled into the nonlinear optical medium through the echelon contact grating and getting segmented in respect of its pulse front during the incoupling, the inclination angle ($\gamma_{NM}$) of the envelope of the echelon contact grating and the initial pulse-front-tilt ($\gamma_0$) of the pump beam directly before its entry into the nonlinear optical medium (i.e. when the pump beam reaches the stair-step echelon) satisfy the relation $\text{tg}(\gamma_{NM})=(n_{p,cs}\text{tg}(\gamma)-\text{tg}(\gamma_0))/(n_{p,cs}-1)$, wherein $n_{p,cs}$ stands for the group refractive index of the nonlinear medium concerned at the pump wavelength. From now on, a generation setup with the aforementioned geometrical properties will be referred to as wedge-like scheme/setup.

The object of providing a method to generate terahertz radiation to be used in practical applications is achieved by elaborating the method according to claim 1. Further preferred variants of the method according to the invention are set forth in claims 2 to 5 and in claim 18. The object of providing a terahertz pulse source to generate terahertz radiation to be used in practical applications is achieved by the terahertz radiation source according to claim 6. Preferred embodiments of the radiation source according to the invention are set forth in claims 7 to 17 and in claim 19.

Compared to the aforementioned terahertz-generation setups in which the LN (or LT) crystal is formed necessarily with a large wedge angle, the solution according to the present invention has got significant advantages. In particular, the present invention allows to generate terahertz radiation of excellent beam quality at high efficiency for small wedge angles (i.e. having a value of at most 20°, more preferably at most 10°, or even less). The technique according to the present invention, the key feature of which lies in freely setting the pulse-front-tilt $\gamma_0$ of the pump beam, is also advantageous over the above-referred plane-parallel echelon contact grating. In knowledge of user demands (terahertz radiation of high energy/with good beam quality), as well as characteristics of the pumping process (pulse length/beam size/wavelength), setting the value of $\gamma_0$ takes place through optimization performed in harmony with the object to be achieved. By suitably setting the value of $\gamma_0$, both the terahertz energy and the THz generation efficiency (that is, the ratio of THz pulse energy and the energy of the pump pulse) become scalable to significantly higher extents than what could be achieved in case of applying the plane-parallel echelon contact grating proposed previously. Setup geometries belonging to optimal beam quality and to the highest THz generation efficiency may differ from each other; the extent of differing is determined by the material of the nonlinear optical medium and the pumping parameters. Thus, the most promising setup can always be obtained at reasonable compromises.

A further important advantage of the inventive technique over the existing, known, practical ones and the conceptual ones is that, in certain embodiments, it is suitable for generating a terahertz beam of high energy and with excellent beam quality even in lack of using optical imaging. This way, the decrease in efficiency due to the imaging defects can be avoided on the one hand, and, on the other hand, the setup becomes simpler.

A yet further important advantage of the inventive technique is that the pulse-front-tilt of the pump beam has got such an initial pulse-front-tilt $\gamma_0$, at which two important and mutually independent criteria can be met. On the one hand, the entry plane of the first optical element with angular-dispersion-inducing properties and the entry plane of the echelon contact grating can be positioned parallel to one another, and thus these two elements can be arranged in arbitrarily close proximity to each other; this way, the possibility of forming significant difference between the pulse lengths at the transversally opposite edges of the pump beam with angular dispersion downstream of said first optical element at the instant when the pump pulse actually reaches the entry plane of the echelon contact grating can be avoided. This also means that, in certain embodiments, there is no need for imaging at all. On the other hand, the first optical element with angular-dispersion-inducing properties (e.g. a transmission optical grating) can be used in the (so-called Littrow) configuration which results in the possible highest diffraction efficiency. In case of LN, both the parallelism of the entry plane of the first optical element with angular-dispersion-inducing properties and the echelon contact grating (that is, a condition which allows to eliminate the imaging optics), and diffraction on the first optical element in the Littrow configuration are accomplished together for an initial pulse-front-tilt of e.g. $\gamma_0=69°$ (or more precisely, at the pump wavelength of 1030 nm, for $\gamma_0=68.9°$, and at the pump wavelength of 800 nm, for $\gamma_0=68.9°$). Thus, the embodiment of the present invention which makes use of an initial front-pulse-tilt of $\gamma_0=69°$ represents a highly preferred embodiment for LN.

Figure 2:
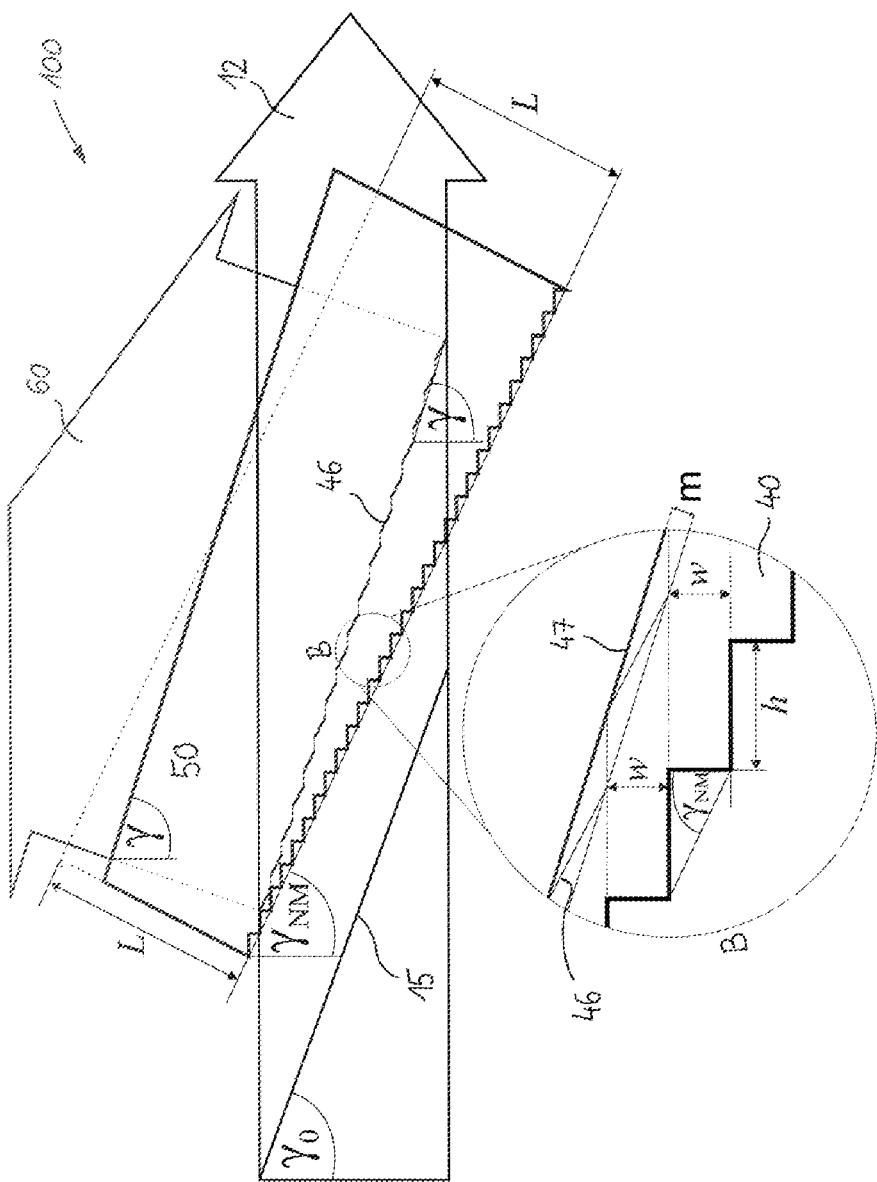
Figure 3:
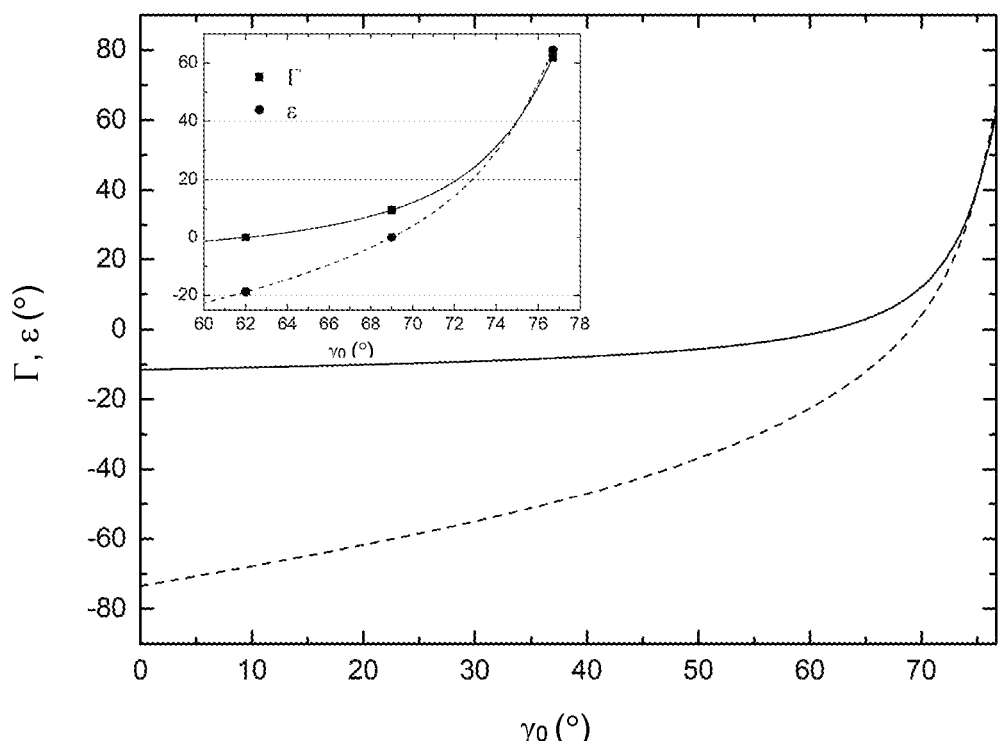
Figure 4A:
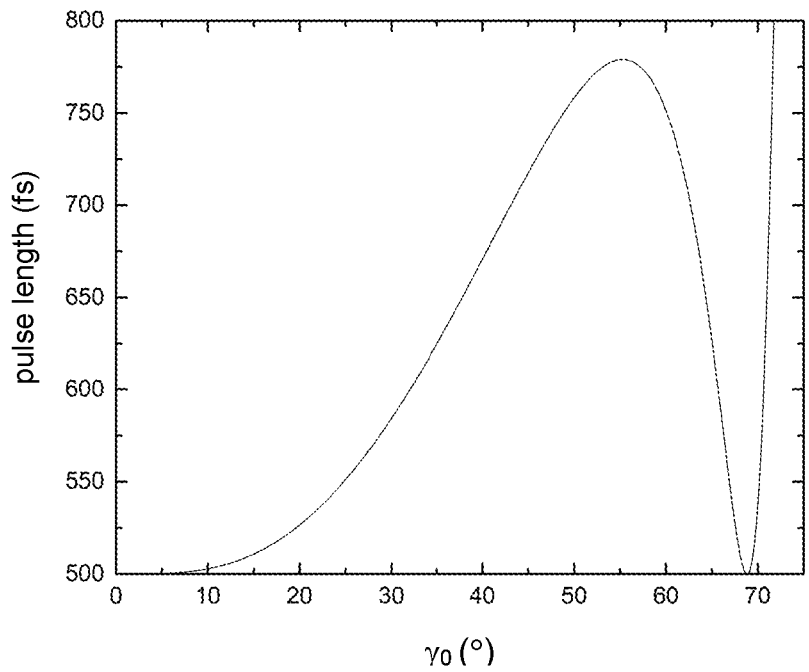
Figure 4B:
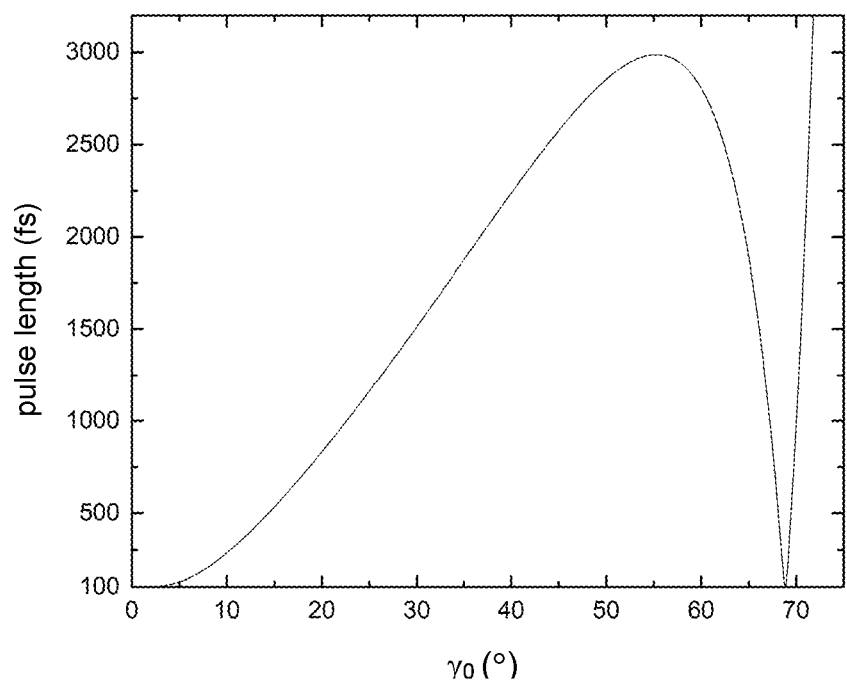
Figure 4C:
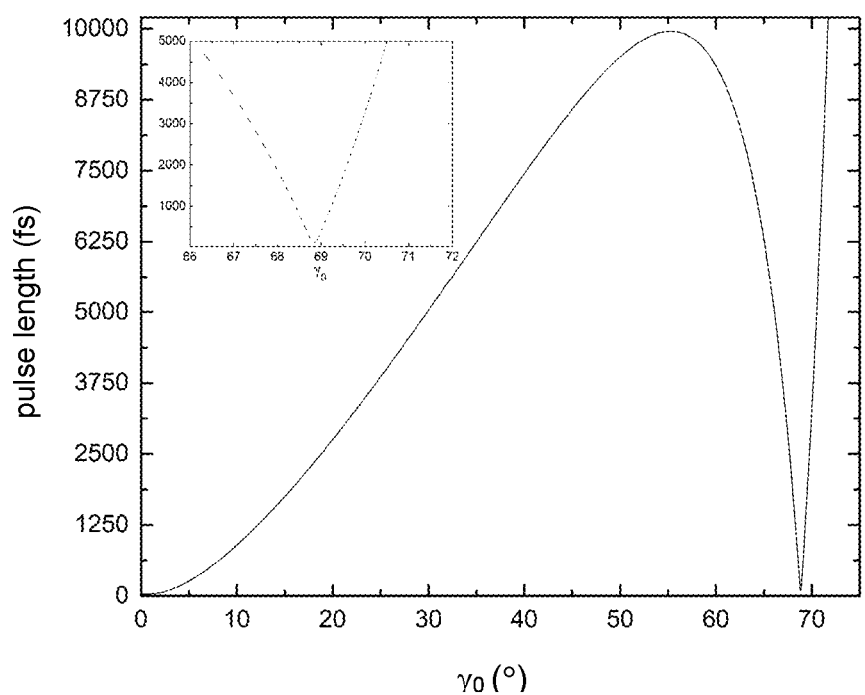
Figure 5A:
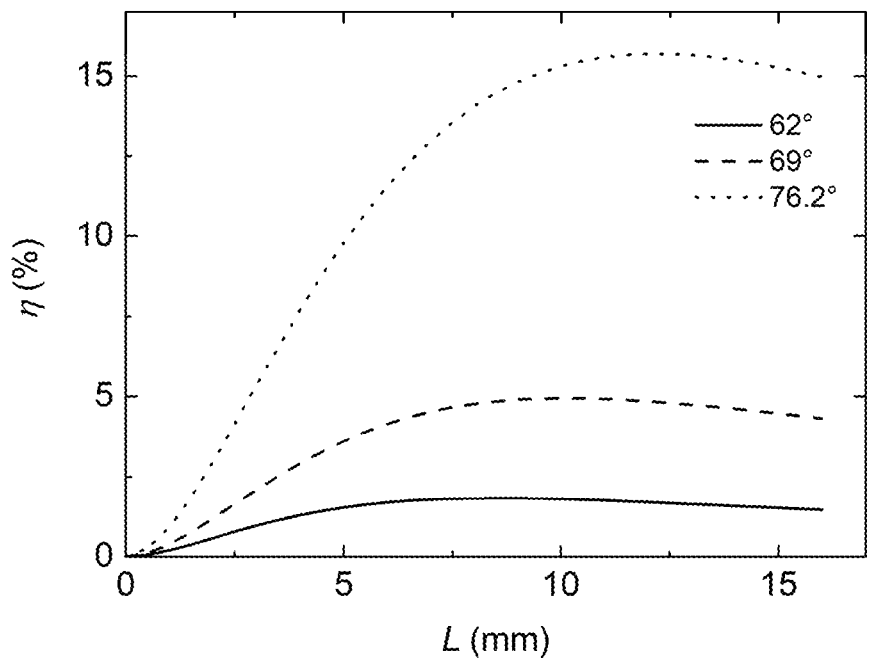
Figure 5B:
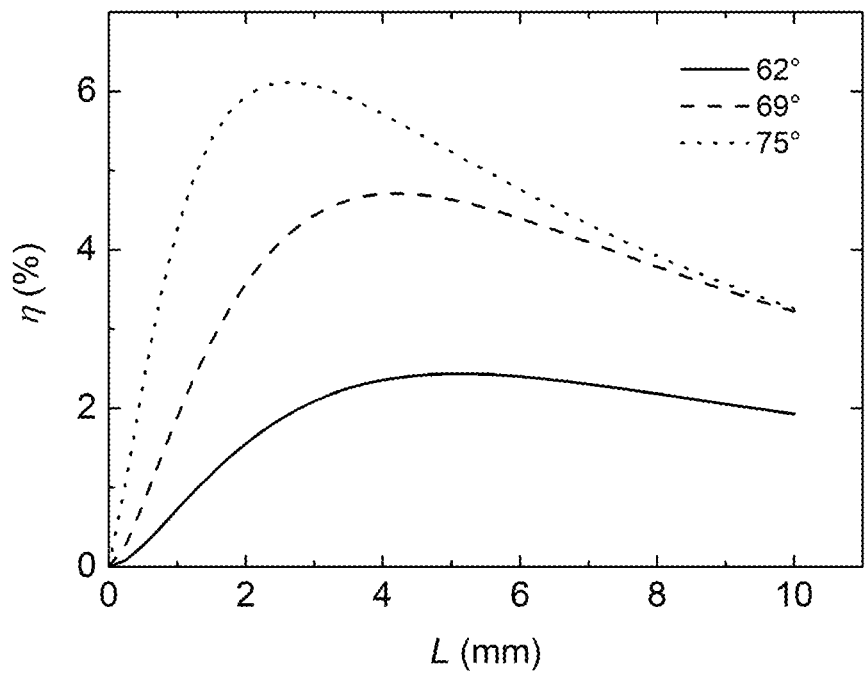
Figure 5C:
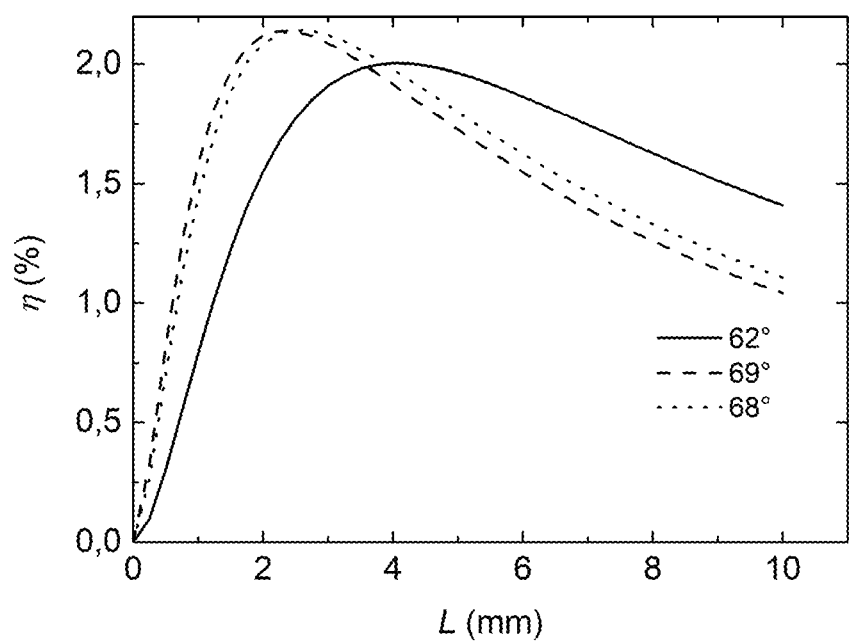

In what follows, the invention is described in detail with reference to the accompanying drawings, wherein FIG. 1 is a longitudinal sectional view of an embodiment of the setup to generate terahertz radiation according to the invention, implemented with an echelon contact grating and comprising a nonlinear optical crystal of a given non-zero wedge angle, wherein the initial pulse-front-tilt $\gamma_0$ of the pump beam is generated by diffraction on a transmission grating;

FIG. 2 illustrates the pulse-front-tilt of the pump beam at entry into the nonlinear optical crystal provided with an echelon contact grating in its entry surface as used in the setup according to the invention shown in FIG. 1;

FIG. 3 shows the wedge angle ($\Gamma$; solid line) of the inventive setup, and the angle ($\epsilon$; dashed line) of the entry plane of the first optical element with angular-dispersion-inducing properties made with the entry plane of the echelon contact grating as a function of the initial pulse-front-tilt angle $\gamma_0$ of the pump beam for an echelon contact grating made of lithium-niobate excited with pump pulses at the wavelength of 1030 nm; here, the insert illustrates the same for the angle $\gamma_0$ ranging from 62° to 77°, with also indicating the value (solid squares) of the wedge angle and the angle (solid circles) of the entry planes of the first optical element made with the echelon contact grating at $\gamma_0=620$, 69° and 76.7°;

FIG. 4 illustrates the pulse length of a pump beam illuminating a wedge-like echelon contact grating on a spot of 20 mm in diameter, said contact grating being in contact with a first optical element with angular-dispersion-inducing properties along an edge perpendicular to the plane of FIG. 1 and said pump beam striking the contact grating adjacent to said edge, as a function of the initial pulse-front-tilt angle $\gamma_0$ of the pump beam in case of transformation-limited pump pulses with different pump wavelengths ($\lambda_0$) [FIGS. 4A, 4B: $\lambda_0=1030$ nm; FIG. 4C: $\lambda_0=800$ nm] and different pulse lengths (to) [FIG. 4A: $\tau_0=500$ fs; FIG. 4B: $\tau_0=100$ fs; FIG. 4C: $\tau_0=30$ fs] at an external location of the entry plane of the wedge-like echelon contact grating which locates furthest from said edge; here, the insert in plot (c) shows the neighborhood of the initial pulse-front-tilt angle $\gamma_0 \sim 69°$ in enlarged view;

FIG. 5 presents the efficiency ($\eta$) of terahertz radiation generation as a function of the average thickness (L) of the optical medium in case of transformation-limited pump pulses with different pump wavelengths ($\lambda_0$) [FIGS. 5A, 5B: $\lambda_0=1030$ nm; FIG. 5C: $\lambda_0=800$ nm] and different pulse lengths (to) [FIG. 5A: $\tau_0=500$ fs; FIG. 5B: $\tau_0=100$ fs; FIG. 5C: $\tau_0=30$ fs], at different pump pulse intensities (I) (not exceeding the destruction threshold intensity at the respective pump pulse length) [FIG. 5A: 50 GW/cm$^2$; FIG. 5B: 250 GW/cm$^2$; and FIG. 5C: 833 GW/cm$^2$], as well as for various initial pulse-front-tilt angles ($\gamma_0$) of the pump pulse at the fixed temperature of 100 K and the fixed step width of w=50 μm; in FIGS. 5A, 5B and 5C, the solid line and the dashed line represent the cases of $\gamma_0$=620 and $\gamma_0$=690, respectively, while the dotted line shows the case of the optimal $\gamma_0$ [that is, FIG. 5A: $\gamma_0$=76.2°; FIG. 5B: $\gamma_0$=75°; and FIG. 5C: $\gamma_0$=68° ] at which the highest terahertz-generation efficiency can be obtained.

FIG. 1 shows a so-called wedge-like terahertz beam generating setup according to the invention and a preferred exemplary embodiment of a radiation source 100 for generating terahertz radiation. The radiation source 100 comprises a pump source 10 for providing a pump beam 12, and an optical element 50 formed by a medium having nonlinear optical properties for generating terahertz radiation 60. The light transmitting optical element 50 is bounded by an exit plane 52 functioning as the exit surface and an entry plane 51 serving as the entry surface, wherein said entry plane makes a given angle with said exit plane; thus the optical element 50 is preferably constructed as an element having a wedge structure with a wedge angle Γ, wherein the wedge angle Γ preferably is at most 20°, more preferably is at most 15°, and most preferably is at most 10°. Putting this another way, the nonlinear optical medium, and in turn the optical element 50 has got an entry surface and an exit surface making a non-zero angle, the wedge angle Γ. The terahertz radiation 60 is generated as a consequence of nonlinear optical interactions, preferably optical rectification, taking place between the pump beam 12 and the material of the optical element 50 in an average thickness L of the optical element 50. Then the radiation 60 exits the optical element 50 through the exit plane 52 thereof and it may then be subjected to further use. In the form of a periodic stair-step (echelon) structure of individual steps 41 with predetermined geometrical parameters, an echelon contact grating 40 is formed on/in the entry plane 51 itself.

The pump source 10 and the optical element 50—as starting and finishing elements, respectively—define a continuous light path which extends between an emitting location of the pump source 10 and the entry plane 51. Along the propagation direction of the pump beam 12, i.e. towards the entry plane 51, the radiation source 100 comprises in said light path an optical element 20 with angular-dispersion-inducing properties and said terahertz generating element 50 having nonlinear optical properties; along said light path, the optical element 20 and the echelon contact grating 40 are arranged at a predetermined distance from and make an angle s with each other. Optionally, in certain embodiments, imaging optics (not shown in the drawing) performing imaging may also be arranged between the optical element and the echelon contact grating 40.

The pump source 10 is preferably a laser source suitable to produce laser pulses—the pump beam 12—in the visible, near- or mid-infrared domain with a pulse length of at most several hundreds of femtoseconds, e.g. a diode pumped Yb laser with a central emission wavelength of 1030 nm or a Ti:sapphire laser with a central emission wavelength of 800 nm. Various other lasers may equally be used as the pump source 10.

The optical element 20 is an optical element that induces angular dispersion of the pump beam 12 incident thereon and passing there through, and thereby also provides a desired tilt (see below) of the pulse front (preferably with zero tilt initially) of the pump beam 12. Accordingly, the optical element 20 is constructed as e.g. a transmission or reflection optical grating, a refraction based optical element (preferably one or more prisms) or a combination thereof (e.g. a prism combined with a diffraction grating, i.e. a so-called grism). In the exemplary embodiment of the radiation source 100 illustrated in FIG. 1, the optical element 20 is preferably a transmission grating having a predetermined lattice constant, however—as it is obvious to a person skilled in the art—it may be formed as other angular-dispersive optical elements, e.g. a reflective grating, less preferably a prism, etc.

The pump beam 12 having an initial pulse-front-tilt of a desired extent enters the optical element 50 through the echelon contact grating 40 at right angle to the limiting plane of width w of the steps 41 of said echelon contact grating 40, as can be seen in FIG. 1. In particular, the pump beam 12 strikes along an optical axis of the radiation source 100 onto the echelon contact grating 40 associated with the optical element 50, said echelon contact grating 40 being arranged transversally to said optical axis and making a predetermined angle with the optical element 50, and passes through the contact grating into the volume of the optical element 50 with a segmented pulse front 46 characterized by an average pulse-front-tilt γ. Pulse-front-tilt γ of the segmented pulse front 46 is equal to the tilt required by the velocity matching condition. The terahertz radiation 60 is generated in the optical element 50 with a phase front that is parallel to an envelope 47 of average pulse-front-tilt of the segmented pulse front 46. Thus, the propagation direction of the terahertz radiation 60 will be necessarily perpendicular to the exit plane 52 of the optical element. Entry of the pump beam 12 into the echelon contact grating 40 as discussed above and exit of the terahertz radiation 60 from said echelon contact grating in a direction perpendicular to the grating determine ambiguously, as conditions, the size $\gamma$-$\gamma_{NM}$ of the wedge angle Γ.

The echelon contact grating 40 is preferably constructed as a periodic stair-step structure by any machining methods known to a person skilled in the art (e.g. by etching). Each step 41 of the stair-step echelon structure comprises a first shorter edge 41b, a second shorter edge 41c and a longitudinal edge 41a which is perpendicular to teach of the the edges 41b, 41c. The steps 41 are characterized by a height h of the edge 41b, a width w of the edge 41c and a step angle α formed between a limiting plane defined by the edges 41b and 41a and the limiting plane defined by edges 41c and 41a, as shown in the enlarged portion A of FIG. 1. Longitudinal edges 41a of the steps 41 of the echelon contact grating 40 are located in a common plane, which will be referred to as envelope 42 from now on. In the embodiment of the radiation source 100 shown in FIG. 1, the step angle α is substantially (i.e. within the tolerance of the manufacturing process used to prepare the echelon contact grating 40) 90°, thus in this case, the respective two limiting planes of each step 41 are perpendicular to each other, i.e. the steps 41 are formed as right-angled steps. In case of further embodiments, the step angle α may slightly larger than 90° (at most by about 15°, preferably at most by about 10°, more preferably at most by just a few degrees), i.e. it may be an obtuse angle; each step may be 'tilted' until the light transmitting property of the obtained periodic structure, i.e. the echelon contact grating 40, or the efficiency of terahertz radiation generation is significantly reduced. For right-angled steps 41, said envelope 42 makes an angle $\gamma_{NM}$ with each edge 41b having width w of the individual steps 41; upon basic geometrical considerations, the size of the angle $\gamma_{NM}$ can be calculated by the relation of $\gamma_{NM}$=a tan(h/w). The period of the echelon contact grating 40 in the direction of the steps, i.e. the width w of the individual steps 41, is several orders of magnitude, preferably at least one or two orders of magnitude larger than the wavelength of the pump beam 12 used for generating terahertz radiation. More preferably, said period of the echelon contact grating 40, i.e. the width w, ranges from at least several times tenfold to at most several hundredfold of the wavelength of the pump beam 12. Preparing optical structures with microstructures corresponding to these periods is much simpler than preparing optical gratings with line densities of 2000-3000 1/mm. To improve the efficiency of coupling-in light, the outer limiting planes of the steps 41 of the echelon contact grating 40 may optionally be provided with an anti-reflective coating.

The optical element 50 is made of a material with an outstandingly high nonlinear optical coefficient, being practically at least 1 pm/V, typically exceeding several tens of pm/V's, and having significantly different refractive indices in the terahertz and the visible domains, i.e. the ratio of the refractive indices in the two domains is more than 1, preferably more than 1.1, more preferably more than 1.2 in practice. The optical element 50 is preferably made of lithium-niobate (LN) or lithium-tantalate (LT), and semiconductor materials, e.g. GaP or ZnTe, preferably with a crystal axis orientation that is the most advantageous for the efficiency of nonlinear optical interactions, thus e.g. for terahertz radiation generation by optical rectification. Furthermore, to reduce reflection losses and to avoid angular dispersion of the generated terahertz radiation 60, the exit plane 52 forming the exit surface in the optical element 50 is configured to emit the radiation from the optical element 50 through the exit plane 52 perpendicular to the exit plane 52.

FIG. 2 and its enlarged portion B illustrate a pulse front 15 of the pump beam 12 for generating terahertz radiation before reaching the echelon contact grating and a pulse front 46 of the same after passing through the echelon contact grating 40 in the terahertz radiation generation process. Pulse front 15 has an initial pulse-front-tilt of angle $\gamma_0$ relative to the phase front of the pump beam 12, i.e. the pump beam 12 is a beam that is pre-tilted to a certain extent regarding its pulse front. It is the pre-tilt of the pulse front 15 and a suitable extent of said pre-tilt (i.e. the value of $\gamma_0$) that will allow the optical element 50 of the terahertz radiation source 100 according to the invention to be formed as a crystal of small wedge angle $\Gamma$, and thus the generation of THz beams being substantially symmetric as to their physical properties. In case of the radiation source 100 according to the invention, pre-tilting (to a desired extent) of the pulse front 15 of the pump beam 12 is preferably induced by an optical element 20 having angular-dispersive properties. Pulse front 46 of the pump beam 12 coupled into the optical element 50 is tilted relative to the phase front of the pump beam 12 within the crystal. As a result of the stair-step configuration of the echelon contact grating 40 used for the incoupling, said pulse front 46 gets segmented, and its tilting is varying (also periodically) from point to point along the pulse front 46. Hence, tilt of the pulse front 46 can be characterized by an average tilt angle $\gamma$. Here, the average tilt angle $\gamma$ is defined as the angle between the phase front of the pump beam 12 within the crystal and an envelope 47 of the pulse front 46 shown in portion B.

To achieve excellent beam quality of the terahertz radiation 60, for generating terahertz radiation within the optical element 50 the pump beam 12 is coupled into the echelon contact grating 40 perpendicular to the limiting planes having width w of the steps 41 of the echelon contact grating;
the velocity matching condition, i.e. $v_{p,cs} \cos(\gamma) = v_{THz,f}$ is fulfilled within the optical element 50, wherein $v_{p,cs}$ is the group velocity of the pump beam 12, $v_{THz,f}$ is the phase velocity of the terahertz radiation 60, and $\gamma$ is a tilt of the pulse front of the pump beam 12 relative to the phase front of the pump beam 12; and the terahertz radiation 60 thus generated exits from the optical element 50 at right angle to the exit plane 52 thereof (see FIG. 1), thereby reducing reflection losses to the minimum and obtaining terahertz radiation 60 free from angular dispersion.

To guarantee the aforementioned, a proper geometrical condition has to be met, namely the angle $\gamma_{NM}$=a tan(h/w) of the envelope 42 of the echelon contact grating 40, the angle $\gamma$ of the envelope 47 of the segmented pulse front 46 and the initial front-pulse-tilt of the pump beam (i.e. the pre-tilt) represented by the angle $\gamma_0$ must satisfy the relation $tg(\gamma_{NM}) = (n_{p,cs}tg(\gamma)-tg(\gamma_0))/(n_{p,cs}-1)$. Furthermore, to couple out the generated terahertz radiation 60 from the optical element 50 in a direction perpendicular to the exit plane 52 of said optical element 50, the wedge angle $\Gamma$ of the echelon contact grating 40 has to be set to just the difference $\gamma-\gamma_{NM}$.

If the above geometric condition is met and the angle $\gamma_0$ is chosen optimally, the terahertz radiation generation takes place by making use of a wedge-like nonlinear optical crystal formed typically with a small wedge angle (which is preferably at most 200, more preferably at most 15°, and most preferably at most 10°) with high terahertz-generation efficiency and almost perfect terahertz beam quality (the pulse properties are substantially free from asymmetries). Moreover, the thus obtained THz radiation is free from angular dispersion.

As it is obvious, by selecting the material of the nonlinear optical medium and the pump source 10, the aforementioned geometrical parameters become unambiguously determined. If the optical element 50 is chosen to be an LN crystal, (assuming a temperature of 100 K to decrease the absorption over the terahertz domain) $\gamma \approx 620$ applies, and thus with $\gamma_0 = 690$, the parameter h/w characteristic of the steps 41 of the echelon contact grating 40 will be h/w=1.3. Choosing now the wavelength of the pump source to be about 1 μm, the absolute length of the width w can be set at about 30 to 100 μm. Hence, the echelon contact grating 40 can now be manufactured with the required dimensions.

FIG. 5 shows, as an example, the efficiency r of terahertz-generation as a function of the average thickness L of the optical medium in case of transformation-limited pump pulses with different pump wavelengths $\lambda_0$ [FIGS. 5A, 5B: $\lambda_0$=1030 nm; FIG. 5C: $\lambda_0$=800 nm] and different pulse lengths to [FIG. 5A: to =500 fs; FIG. 5B: $\tau_0$=100 fs; FIG. 5C: $\tau_0$=30 fs], at different pump pulse intensities I (not exceeding the destruction threshold intensity at the respective pump pulse length) [FIG. 5A: 50 GW/cm$^2$; FIG. 5B: 250 GW/cm$^2$; and FIG. 5C: 833 GW/cm$^2$], as well as for various initial pulse-front-tilt angles $\gamma_0$ of the pump pulse at the fixed temperature of 100 K and the fixed step width of w=50 μm. In FIGS. 5A, 5B and 5C, the solid line and the dashed line represent the cases of $\gamma_0$=620 and $\gamma_0$=690, respectively, while the dotted line shows the case of the optimal $\gamma_0$ [that is, FIG. 5A: $\gamma_0$=76.2°; FIG. 5B: $\gamma_0$=75°; and FIG. 5C: $\gamma_0$=68° ] at which the highest terahertz-generation efficiency can be obtained. The choice of $\gamma_0$=620 (which, anyway, corresponds to terahertz-generation by means of a plane-parallel echelon contact grating made of LN) is made to allow a direct comparison with the paper by L. Pálfalvi et al., entitled "*Numerical investigation of a scalable setup for efficient terahertz generation using a segmented tilted-pulse-front excitation*" (see Optics Express, vol. 25, issue 24, pp. 29560-29573 (2017)). The choice of $\gamma_0$=690 is of great importance from the point of view of practical realization; in such a case, if a transmission optical grating is used to induce the initial pulse-front-tilt (pre-tilt) of the pump beam, the nonlinear optical element 50 can be arranged arbitrarily close to the transmission grating (as the angle ε made by the two elements is zero, as is also shown in FIG. 3) and, thus, no difference forms between the pulse lengths at the diametrically opposing edges of the pump beam (see FIG. 4).

A detailed description of the mathematical model providing proper background for the derivation of the curves shown here can be found in a separate scientific publication by the inventors to be published in future, and goes beyond the limits of the present application. However, FIG. 5 clearly shows, that theoretical calculations (represented by the dotted line) performed for a practical configuration of the wedge-like setup according to the invention being the most effective in terms of terahertz-generation predict an increase in the terahertz-generation efficiency η compared to what can be achieved by using a plane-parallel echelon contact grating (represented by the solid line). Said increase in efficiency is markedly high for pump pulse lengths in the range of 50 fs and 1 ps; such cases are illustrated in FIGS. 5A and 5B, too. In cases where implementing in practice is simple and easy without the application of imaging (see the dashed line, $\gamma_0=69°$), an increase in the terahertz-generation efficiency η can be expected as well compared to what can be achieved by using a plane-parallel echelon contact grating (represented by the solid line). It should be here also noted, that the inventive setup (see the dashed line) is highly promising for short pulses (see FIG. 5C), since the possible highest efficiency (represented by the dotted line) is almost reached when it is applied.

It is also important to note here, that the wedge-like setup proposed in this patent application significantly differs from the setup disclosed in the paper by Abgaryan et al., entitled "*Investigation of parameters of terahertz pulses generated in single-domain LiNbO3 crystal by step-wise phase mask*" (see Journal of Contemporary Physics (Armenian Academy of Sciences), Vol. 51, issue 1., pp. 35-40 (2016)). Although the paper concerned teaches a terahertz-generation technique wherein the pump beam is coupled into a nonlinear optical medium through a stair-step structure, the stair-step structure constructed in accordance with the paper concerned is made of a material which differs from the LN material of the prism serving for the nonlinear optical processes in case of the inventive setup (hence, the refractive index of the stair-step structure of Abgaryan et al. also differs from that of LN), contrary to the present invention wherein the individual stair-steps, and thus the echelon contact grating itself, are formed in the entry surface of the LN medium, and thus are made of LN, which makes a huge difference. A further difference lies in the fact that the wedge angle of the LN prism according to Abgaryan et al. corresponds to the wedge angle of 63° commonly used in traditional known setups/schemes; contrary to this, the wedge angle of the optical element made of LN used in the setup/scheme according to the present invention is much less (due to the possibility of pre-tilting). A yet further basic difference is that the terahertz-generation scheme according to Abgaryan et al. applies a pump beam with no initial pulse-front-tilt; contrary to this, the extent of an initial pulse-front-tilt of the pump beam represents a parameter of the inventive terahertz-generation scheme that can be freely adjusted. As a consequence, the terahertz-generation technique disclosed in the paper by Abgaryan et al. is strongly limited in terms of both the THz energy scalability and the achievable THz beam quality.

Summary: a novel terahertz-generating scheme for generating high energy terahertz radiation has been developed by combining the conventional pulse-front-tilting technique with a transmission echelon contact grating for coupling the pump pulse into a nonlinear optical crystal, wherein the period of the stair-step structure ranges between several times tenfold and several times hundredfold of the wavelength of the pump beam. The greatest advantage of the novel scheme is that the optical crystal can be used in the scheme in the form of an element that has a small wedge angle if certain simple geometrical criteria are met. As a result, THz beams with excellent beam qualities and substantially symmetric in their physical properties can be generated at improved generation efficiencies. In case of applying an initial pulse-front-tilt (i.e. pre-tilt) of the pump beam of certain extent, there is no need for the application of imaging after pre-tilting; this way, the size of the pump beam and thereby the energy of the terahertz pulse generated can be equally increased. The terahertz radiation source and method according to the invention based on said novel scheme are particularly advantageous for the generation of high energy THz radiation that requires the application of wide pump beams.

The invention claimed is:

1. A method of generating terahertz radiation in a nonlinear optical medium, the method comprising:
   pre-tilting a pump beam by subjecting the pump beam to pulse-front-tilting to create a tilted-pulse-front pump beam;
   coupling the tilted-pulse-front pump beam into the nonlinear optical medium through a stair step structure; and
   generating THz radiation in the optical medium by nonlinear optical processes using the pump beam,
   inducing pulse-front-tilt of the pump beam to satisfy a velocity matching condition of $v_{p,cs} \cos(\gamma) = v_{THz,f}$ as a sum of a plurality of pulse-front-tilts induced separately as a partial pulse-front-tilt of the pump beam in subsequent steps, where $v_{p,cs}$ is group velocity of the pump beam, $v_{THz,f}$ is phase velocity of the THz pulse, and γ is an angle formed between a pulse front and a phase front of said pump beam,
   wherein the nonlinear optical medium comprises an entry surface and an exit surface bounding the nonlinear optical medium in the pump beam's propagation direction and forming a non-zero angle, and
   wherein said stair-step structure is formed in the entry surface.

2. The method according to claim 1, wherein the pump beam is a laser pulse in the visible, near- or mid-infrared domain with a pulse length of at least femtoseconds, but at most several hundreds of femtoseconds.

3. The method according to claim 1, further comprising performing a first step of pulse-front-tilting of the pump beam by guiding said pump beam through an optical element with angular-dispersion-inducing properties, the optical element with angular-dispersion-inducing properties being selected from a group consisting of diffraction based optical elements, refraction based optical elements, optical elements implemented as a combination of said diffraction based elements and refraction based elements.

4. The method according to claim 3, further comprising guiding the pump beam leaving the optical element with angular-dispersion-inducing properties to the stair-step structure through imaging optics.

5. The method according to claim 3, wherein the optical element with angular-dispersion-inducing properties performing said pre-tilting is a transmission grating, and wherein the extent of said pre-tilting is set to have said transmission grating and the entry surface of the nonlinear optical medium arranged parallel to one another when said transmission grating is used in Littrow configuration, that results in maximum diffraction efficiency.

6. The method according to claim 1, wherein said angle is at most 20°.

7. A terahertz radiation source, comprising a pump source for emitting a pump beam and a nonlinear optical medium for generating THz pulses,
wherein the pump source and the nonlinear optical medium define together a light path arranged to guide said pump beam from the pump source to an entry surface of the nonlinear optical medium bounding said light path, and
wherein an optical element with angular-dispersion-inducing properties is arranged in said light path, and
wherein said nonlinear optical medium comprises an exit surface that bounds, together with the entry surface, the nonlinear optical medium in the pump beam's propagation direction, said entry surface and said exit surface arranged to form a non-zero angle, and
wherein a stair-step structure is formed in the entry surface of the nonlinear optical medium.

8. The terahertz radiation source according to claim 7, wherein the stair-step structure is formed by steps arranged one after another along a first direction on a surface of the stair-step structure, each of said steps having two shorter edges and one longitudinal edge, said longitudinal edge extending perpendicularly to both shorter edges.

9. The terahertz radiation source according to claim 7, wherein imaging optics is arranged in the light path between the optical element with angular-dispersion-inducing properties and the entry surface of the nonlinear optical medium.

10. The terahertz radiation source according to claim 7, wherein the optical element with angular-dispersion-inducing properties is selected from a group consisting of diffraction based optical elements, refraction based optical elements and optical elements implemented as a combination of said diffraction based optical elements and refraction based optical elements.

11. The terahertz radiation source according to claim 7, wherein the optical element with angular-dispersion-inducing properties is a transmission grating configured to perform pre-tilting of the pump beam, wherein the extent of said pre-tilting is set to have said transmission grating and the entry surface of the nonlinear optical medium arranged parallel to one another when said transmission grating is used in Littrow configuration, that results in maximum diffraction efficiency.

12. The terahertz radiation source according to claim 7, wherein limiting planes of the steps forming the stair-step structure are perpendicular to one another, said limiting planes being defined by a first shorter edge and the longitudinal edge, and a second shorter edge different from the first shorter edge and the longitudinal edge.

13. The terahertz radiation source according to claim 7, wherein the dimensions of two shorter edges of steps forming the stair-step structure are larger by at least one or two orders of magnitude than the wavelength of the pump beam.

14. The terahertz radiation source according to claim 13, wherein the dimensions of the two shorter edges of each step are in the range of at least several tens of micrometers.

15. The terahertz radiation source according to claim 7, wherein the nonlinear optical medium is made of a material whose refraction indices in terahertz and visible domains are significantly different.

16. The terahertz radiation source according to claim 7, wherein the nonlinear optical medium comprises a lithium-niobate (LiNbO3) crystal or a lithium-tantalate (LiTaO3) crystal.

17. The terahertz radiation source according to claim 16, wherein the nonlinear optical medium is made of lithium-niobate, and the extent of the pre-tilting is approximately $\gamma=69°$.

18. The terahertz radiation source according to claim 7, wherein the pump beam is a laser pulse in the visible, near- or mid-infrared domain with a pulse length of at least 5 femtoseconds, but at most several hundred femtoseconds.

19. The terahertz radiation source according to claim 7, wherein said angle is at most 20°.

* * * * *